O. B. MUELLER.
DEVICE FOR PASSING CABLES THROUGH PIPE LINES.
APPLICATION FILED NOV. 11, 1909.
1,035,994.
Patented Aug. 20, 1912.
3 SHEETS—SHEET 1.
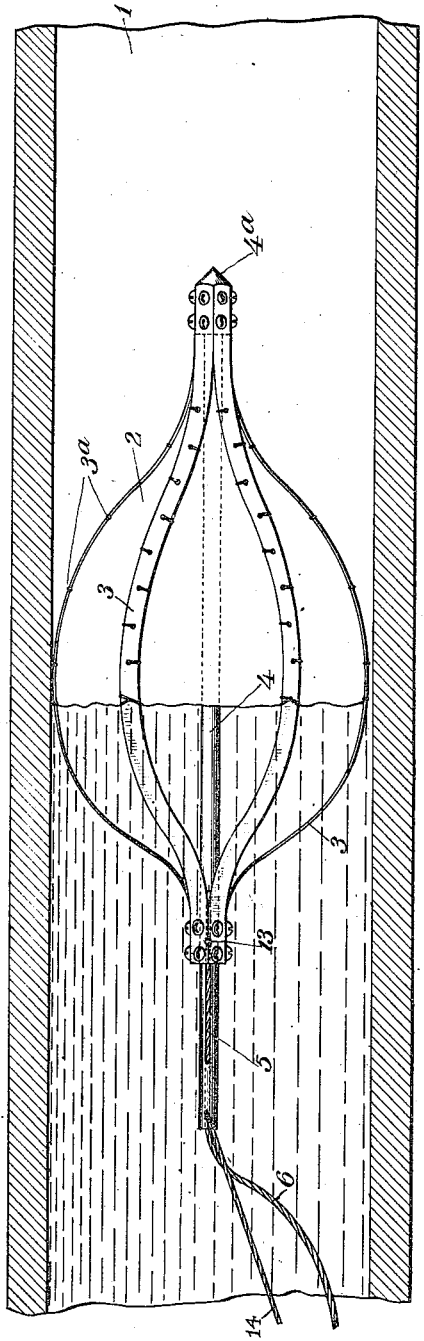
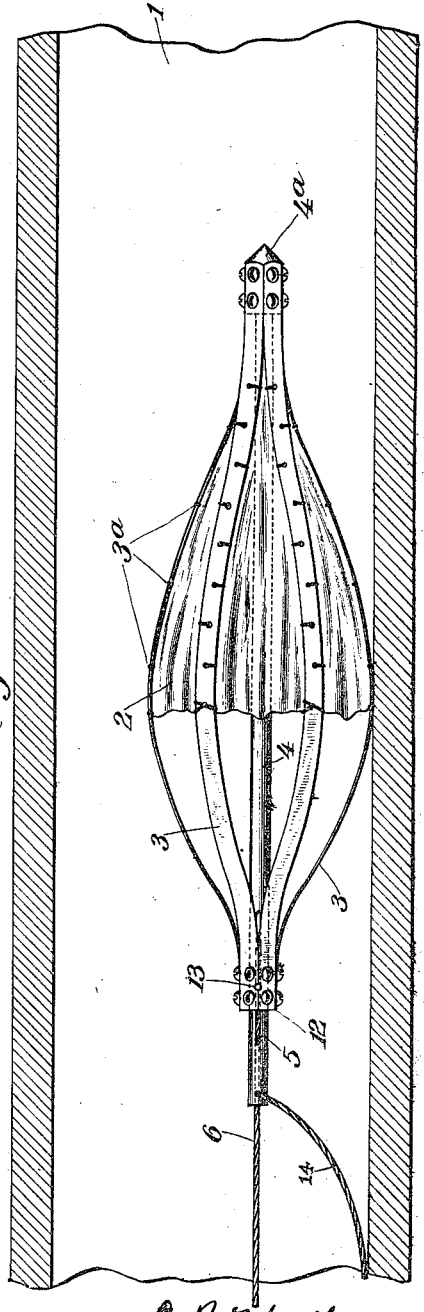

O. B. MUELLER.
DEVICE FOR PASSING CABLES THROUGH PIPE LINES.
APPLICATION FILED NOV. 11, 1909.
1,035,994.
Patented Aug. 20, 1912.
3 SHEETS—SHEET 2.
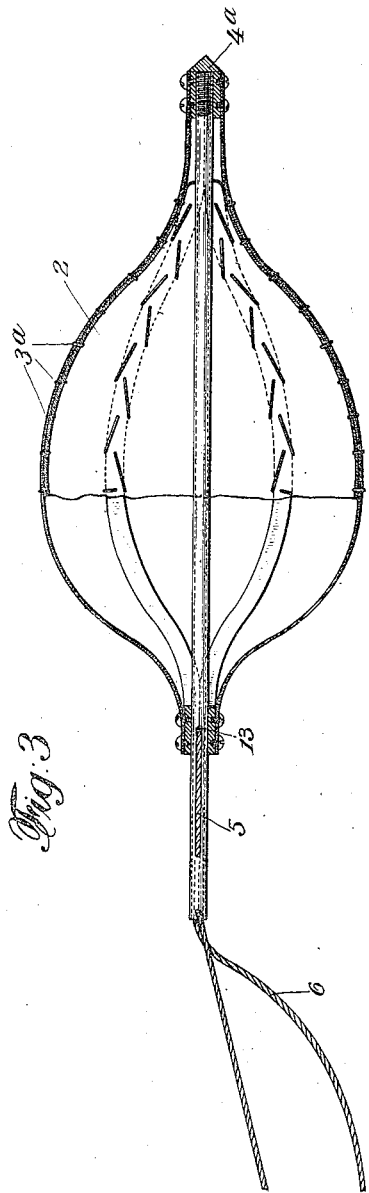
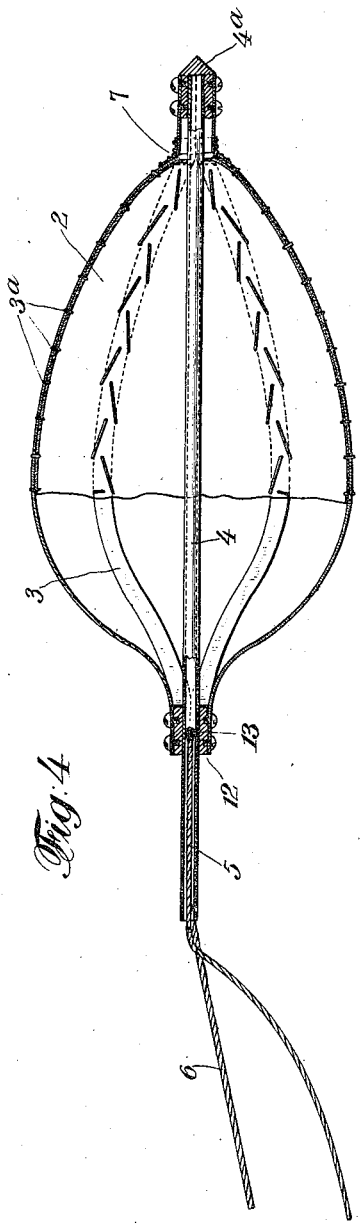
Witnesses:
Inventor
O. B. Mueller
By his Attorneys Kenyon & Kenyon

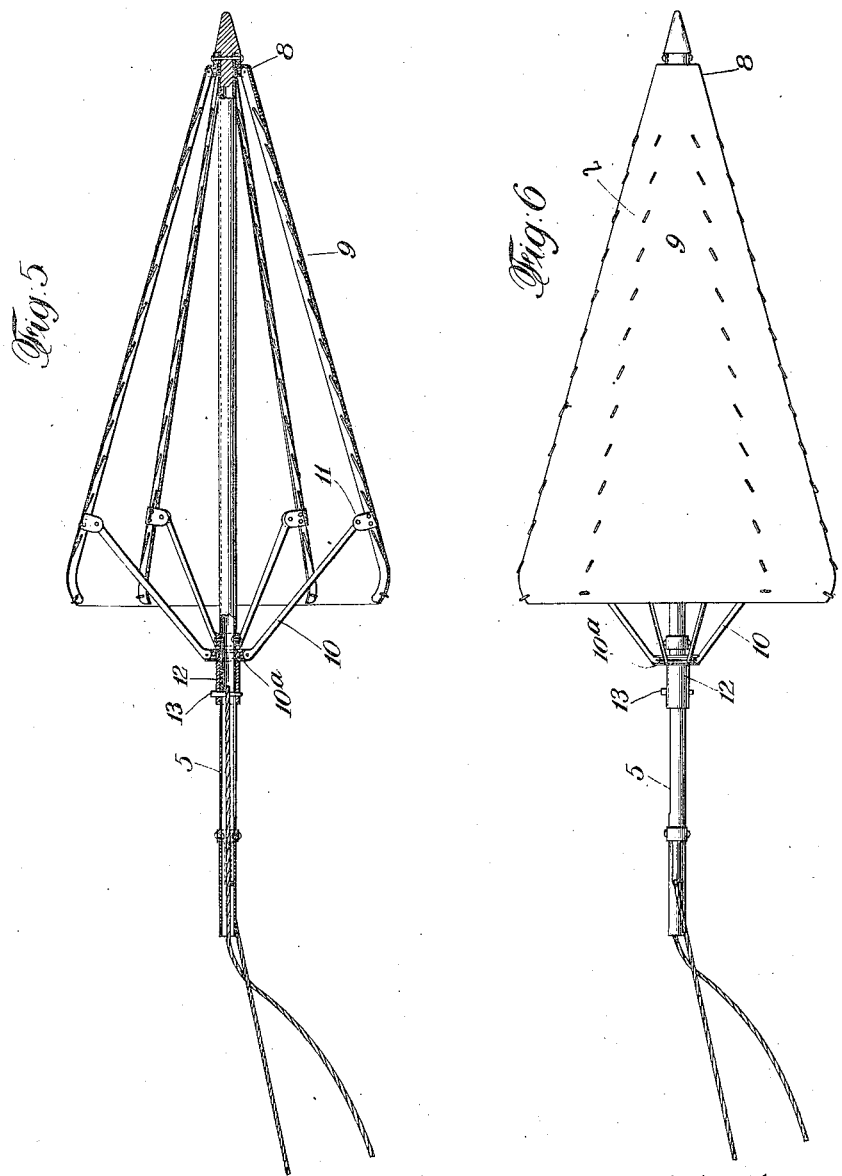

UNITED STATES PATENT OFFICE.

OSCAR B. MUELLER, OF NEW ROCHELLE, NEW YORK, ASSIGNOR TO NATIONAL WATER MAIN CLEANING COMPANY, A CORPORATION OF MAINE.

DEVICE FOR PASSING CABLES THROUGH PIPE-LINES.

1,035,994.   Specification of Letters Patent.   Patented Aug. 20, 1912.

Application filed November 11, 1909. Serial No. 527,462.

*To all whom it may concern:*

Be it known that I, OSCAR B. MUELLER, a citizen of the United States, and a resident of New Rochelle, county of Westchester, and State of New York, have invented certain new and useful Improvements in Devices for Passing Cables Through Pipe-Lines, of which the following is a specification.

My invention relates to devices for passing of cables through water mains and like pipe lines and it is particularly adapted for the passing of cables through pipe lines in which the incrustations in the bore of the pipe are apt to cause the device to become jammed, or make it necessary to withdraw the carrier device backward through the pipe or pull it back a short distance. Heretofore in devices of this character the pressure of the water causing the cup to expand would retain it in that position so that it was practically impossible to withdraw the device from the pipe in the direction in which it had just passed, as the cup would catch on the incrustations or joints in the pipe and thus prevent the withdrawal of it. In my improved device I overcome this by providing means for causing the cup to collapse within the pipe line.

In the drawing filed herewith, Figure 1 shows a form of my improved device within a pipe line in which the cup is fully expanded. Fig. 2 shows my device within a pipe line partially collapsed. Fig. 3 shows a sectional view through the carrier device shown in Fig. 1. Fig. 4 shows a modification in section of Fig. 1. Figs. 5 and 6 show a modification of my invention.

In the drawing, in which like numerals represent like parts, 1 represents a pipe line. 2 represents a flexible cup which may be made of leather or any other flexible material. This cup 2 is shown mounted upon a shaft 4, having a pointed end $4^a$. Also mounted upon this shaft near the end $4^a$ or below the bottom of the cup are a series of springs 3 which extend lengthwise of the shaft outside of the cup and are fixedly secured at their other end by bolts to a movable sleeve 12. The rod or shaft 4 is made hollow at one end so as to permit the line 6 to pass through it. This line 6 is fastened to a bolt or pin 13 passing through the movable sleeve 12 and through the slot 5 in the shaft 4. The shaft 4 may be made entirely hollow or only a portion of it hollow, but if it is made entirely hollow the pointed end should be closed by means of a cap $4^a$ preferably pointed as shown. The flexible cup in Figs. 1, 2, 3 and 4 is preferably connected to the springs or ribs 3 by means of stitching $3^a$.

When in use my device is placed in a pipe line and the pressure of water, as shown in Fig. 1, expands the cup which is prevented from inversion by means of the springs or ribs 3. As the cup expands it extends the springs or ribs 3 away from the rod 4, thus reducing the distance between the movable sleeve 12 and the pointed end $4^a$ of the rod. The flow of water and the pressure caused thereby exerted within the cup will carry the same along in the direction in which the point $4^a$ of the cup is directed, thus drawing through the pipe, the cable 14. If it is desired to withdraw the carrier back in the direction opposite to which it has been carried by the flow of water, the line 6 may be pulled upon, thus drawing the movable member 12 away from the pointed end $4^a$ of the carrier, which in turn will contract the springs or ribs 3 causing the cup to collapse, as shown in Fig. 2 of the drawing. It will be noted that in Fig. 1 the cable 14 is taut as this is the cable which it is desired to have carried through the pipe while the line 6 is slack while in Fig. 2 the reverse is the case as the line 6 is being pulled so as to cause the cup to collapse.

In Fig. 4 I show a modification in which the ribs or springs 3 are secured to the pointed end of the cap $4^a$ by means of hinges 7.

In Figs. 5 and 6 I show another modification in which the flexible cup 2 is prevented from inversion by means of the ribs 9 loosely mounted on the rod 4 by means of hinges 8, the opposite ends of said ribs or rods being connected to the movable sleeve 12 by means of ribs 10 loosely connected to the ribs 9 at 11 and to the movable sleeve 12 at $10^a$. This form of device when in use operates in the same way that the form shown in the other four figures operate.

What I claim as new and desire to secure by Letters Patent, is:

1. In a device for drawing cables through pipe lines, a cup piston, having springs tending to expand the piston against the inner walls of the pipe line, a cable secured to the piston and adapted to be drawn through the pipe thereby, and a second cable connected to the springs to contract the piston.

2. In a device for drawing cables through pipe lines, a cup piston, having spring members each having outwardly pressing portions tending to expand the piston, a cable connected to the piston, and a second cable connected to the springs and adapted to control the position of the outer portions of said springs.

3. In a device for drawing cables through pipe lines, a cup piston, having a longitudinally disposed member, longitudinally disposed springs tending to expand the piston against the inner walls of the pipe line, a sleeve longitudinally slidable along said member and connected to said springs, and a cable connected to said sleeve.

4. In a device for drawing cables through pipe lines, a cup piston, having a longitudinally disposed member, a sleeve longitudinally movable along said member, longitudinally disposed bow-shaped springs secured at one end to said sleeve, and a cable connected to said sleeve.

In testimony whereof, I have signed my name to this specification, in the presence of two subscribing witnesses.

OSCAR B. MUELLER.

Witnesses:
　RICHARD EYRE,
　H. A. GRUNAN.